(12) United States Patent
Omata (10) Patent No.: US 6,414,776 B1
(45) Date of Patent: Jul. 2, 2002

(54) INFRARED SIGNAL RECEIVER WITH ATTENUATING CIRCUIT

(75) Inventor: Takashi Omata, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,504

(22) Filed: Jan. 27, 1999

(30) Foreign Application Priority Data

Jan. 30, 1998 (JP) ............................. 10-019217

(51) Int. Cl.⁷ .......................... H04B 10/06; H04B 10/00
(52) U.S. Cl. ...................... 359/189; 359/193; 359/147; 359/142; 359/214
(58) Field of Search ................................ 359/189, 193, 359/147, 142, 214

(56) References Cited

U.S. PATENT DOCUMENTS

| | | | | |
|---|---|---|---|---|
| 5,216,238 A | * | 6/1993 | Yoshioka | 250/214 |
| 5,448,393 A | * | 9/1995 | Lentine | 359/193 |
| 5,506,715 A | * | 4/1996 | Zhu | 359/147 |
| 5,729,373 A | * | 3/1998 | Sakuyama | 359/189 |
| 6,038,049 A | * | 3/2000 | Shimizu | 359/189 |
| 6,188,499 B1 | * | 2/2001 | Majima | 359/193 |
| 6,236,484 B1 | * | 5/2001 | Isoda | 359/142 |
| 6,266,173 B1 | * | 7/2001 | Hayes | 359/189 |

FOREIGN PATENT DOCUMENTS

| | | | |
|---|---|---|---|
| JP | 5-236039 | * | 9/1993 |
| JP | 6-176874 | | 6/1994 |
| JP | 6-177724 | | 6/1994 |
| JP | 6-181458 | | 6/1994 |
| JP | 8-18472 | | 1/1996 |
| JP | 8-149086 | | 6/1996 |

* cited by examiner

Primary Examiner—Jason Chan
Assistant Examiner—David C. Payne
(74) Attorney, Agent, or Firm—Sughrue Mion, PLLC (57) ABSTRACT

An infrared signal receiver has an infrared radiation sensor, an amplifier, a band-pass filter, an attenuator, a detector, and a waveform shaper. An output signal from the band-pass filter and an attenuated signal from the attenuator are supplied to the detector. The detector has a DC level shifter which produces a DC offset from the output signal from the band-pass filter and the attenuated signal from the attenuator, and adds the DC offset, as a detecting threshold voltage, to a voltage which turns on and off transistors of a differential amplifier of the detector.

6 Claims, 6 Drawing Sheets

OFF ON OFF ON

FIG. 3B
PRIOR ART detecting threshold voltage
BPF output signal
DC offset
silence noise
group delay

FIG. 4A
PRIOR ART longer than 108ms

FIG. 4B
PRIOR ART enlarged

FIG. 4C
PRIOR ART detecting threshold voltage
increase
DC offset
BPF output signal

FIG. 4D
PRIOR ART proper pulse

INFRARED SIGNAL RECEIVER WITH ATTENUATING CIRCUIT

BACKGROUND OF THE INVENTION

1. Field of the Invention

The present invention relates to an infrared signal receiver.

2. Description of the Related Art

Figure 1:
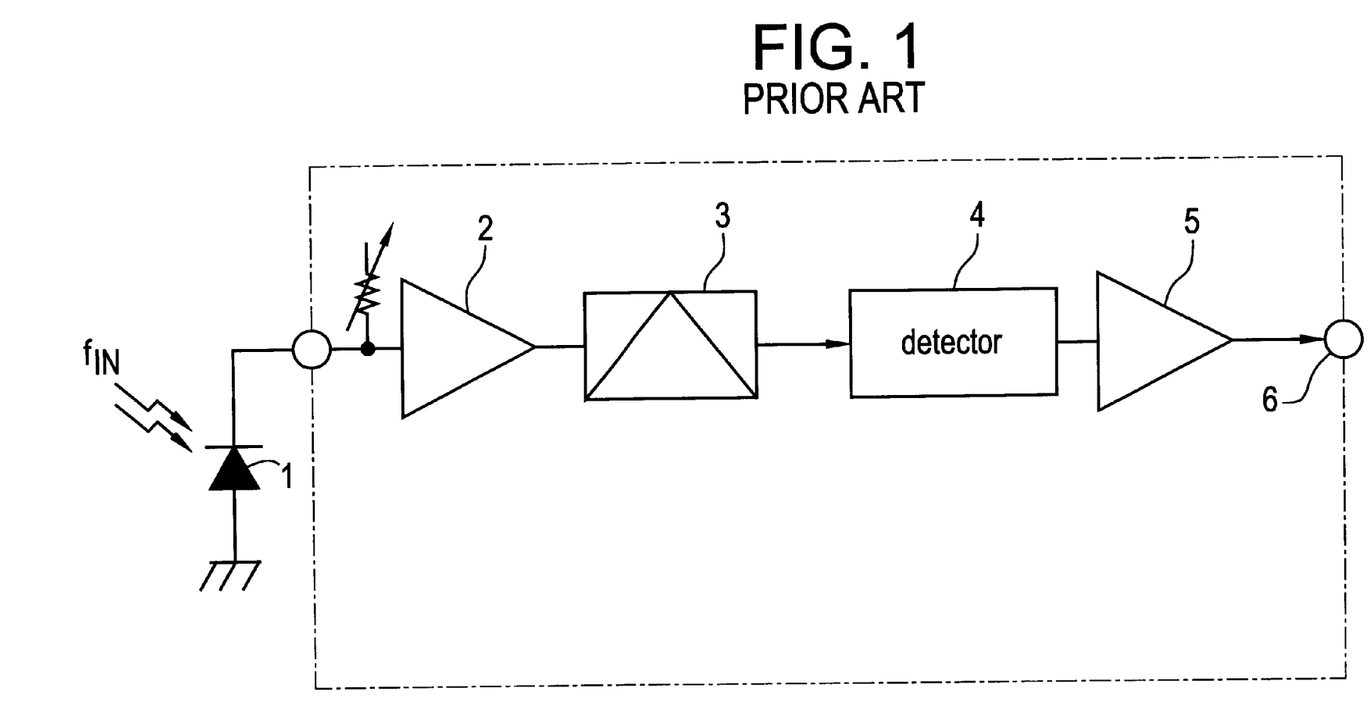
FIG. 1 is a block diagram of a conventional infrared signal receiver.

FIG. 1 of the accompanying drawings shows in block form a conventional infrared signal receiver. A pulse-position-modulated (PPM) signal which is generated when a carrier having a certain frequency is turned on and off is applied to energize an infrared LED to generate a modulated infrared radiation signal. As shown in FIG. 1, such a modulated infrared radiation signal is received by an infrared radiation sensor 1, and then amplified by an amplifier 2. The amplified signal is a passed through a band-pass filter (BPF) 3 that is tuned to the carrier of the PPM signal, so that unwanted signal components and noise are removed from the signal from the amplifier 2. The BPF 3 supplies an output signal to a detector 4 which detects low and high levels of the PPM signal. An output signal from the detector 4 is shaped in waveform by a waveform shaper 5, which outputs pulses depending on the carrier of the PPM signal from an output terminal 6.

The infrared radiation sensor 1 generally comprises a Pin photodiode.

Figure 2:
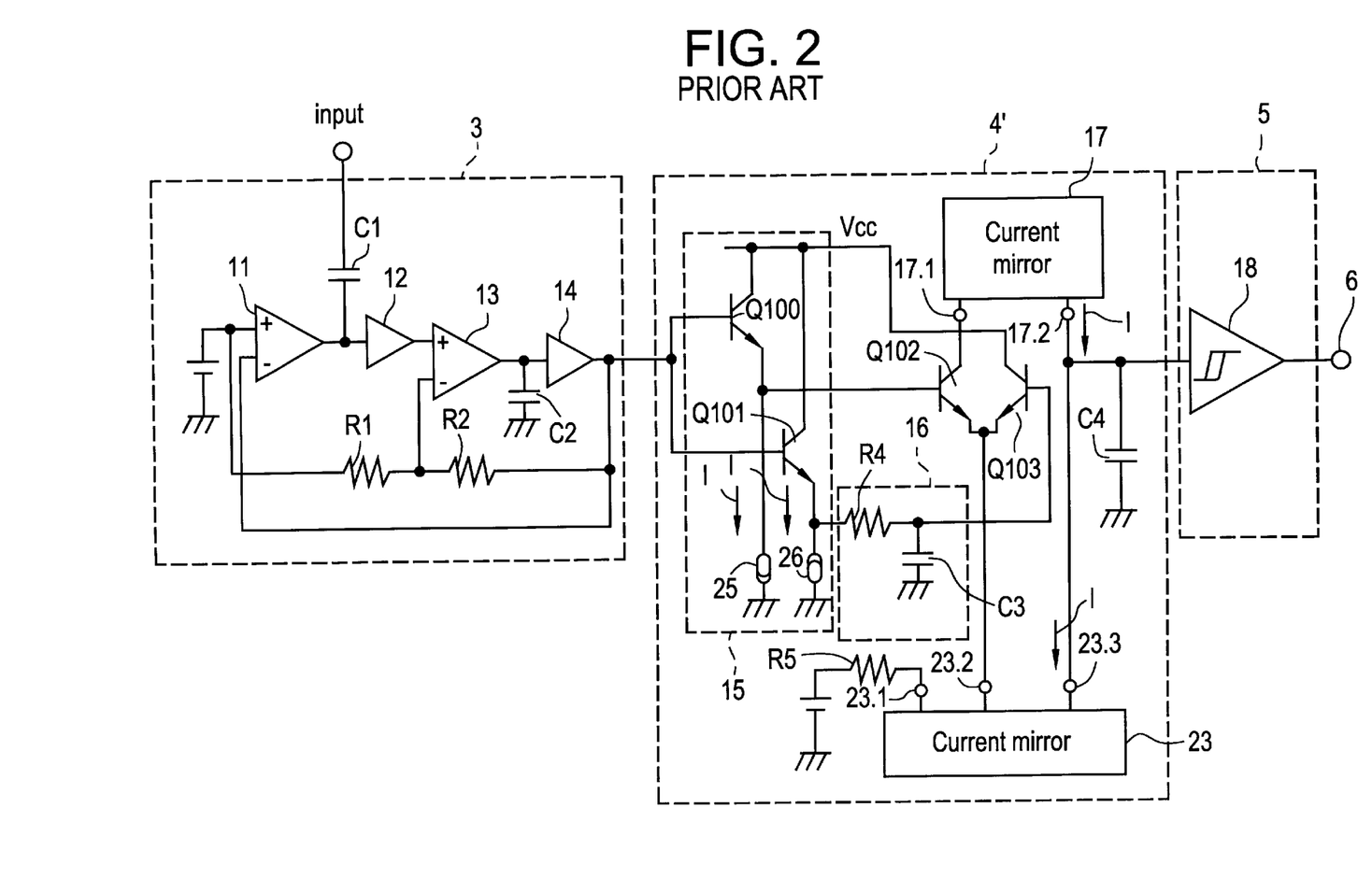
FIG. 2 is a circuit diagram of the conventional infrared signal receiver, except an amplifier, shown in FIG. 1.

The BPF 3, the detector 4, and the waveform shaper 5 will be described in detail with reference to FIG. 2 of the accompanying drawings. As shown in FIG. 2, in the BPF 3, a capacitor C1 has a terminal connected to the output terminal of the amplifier 2 and another terminal connected to an input terminal of a buffer 12 and an output terminal of a variable-transconductance amplifier 11 which has a noninverting input terminal and an inverting input terminal. The buffer 12 has an output terminal connected to a noninverting input terminal of a variable-transconductance amplifier 13. The variable-transconductance amplifier 13 has an output terminal connected to an input terminal of a buffer 14 and a terminal of a capacitor C2. The capacitor C2 has another terminal connected to ground. The buffer 14 has an output terminal connected to the inverting input terminal of the variable-transconductance amplifier 11 and a terminal of a resistor R2. The noninverting input terminal of the variable-transconductance amplifier 11 is connected to a positive terminal of a voltage source and a terminal of a resistor R1. The other terminal of the resistor R1 is connected to the other terminal of the resistor R2 and an inverting input terminal of the variable-transconductance amplifier 13. The capacitors C1, C2, the variable-transconductance amplifiers 11, 13, the buffers 12, 14, and the resistors R1, R2 thus connected jointly make up the BPF 3 whose input terminal is provided by the terminal of the capacitor C1 which is connected to the amplifier 2 and whose output terminal is provided by the output terminal of the buffer 14.

The BPF 3 has a tuned frequency f0 expressed by the following equation (1):

$$f0 = \frac{1}{2\pi\sqrt{C1 \times C2}} \sqrt{gm1 \times gm2} \quad (1)$$

where C1, C2 represent the respective capacitances of the capacitors C1, C2, and gm1, gm2 represent the respective transconductances of the variable-transconductance amplifiers 11, 13.

The BPF 3 thus amplifies only a signal whose frequency is tuned with the tuned frequency f0 depending on the amount of feedback that is established by the resistors R1, R2.

The output terminal of the BPF 3 is connected to an input terminal of a DC level shifter 15 of the detector 4. The DC level shifter 15 has a pair of NPN transistors Q100, Q101 having respective bases connected to each other. The NPN transistor Q100 has an emitter connected to a constant-current supply 25 and serving as a first output terminal of the DC level shifter 15. The NPN transistor Q101 has an emitter connected to a constant-current supply 26 and serving as a second output terminal of the DC level shifter 15. The first output terminal of the DC level shifter 15 is connected to the base of an NPN transistor Q102 of a differential amplifier. The second output terminal of the DC level shifter 15 is connected to an input terminal of a low-pass filter 16. The low-pass filter 16 comprises a resistor R4 having a terminal which serves as the input terminal of the low-pass filter 16 and another terminal connected to a terminal of a capacitor C3 whose other terminal is grounded. The junction between the resistor R4 and the capacitor C3 serves as an output terminal of the low-pass filter 16. The output terminal of the low-pass filter 16 is coupled to the base of an NPN transistor Q103 of the differential amplifier. The differential amplifier has an output terminal connected to an input terminal 17.1 of a current mirror 17 whose output terminal 17.2 is connected to an output terminal 23.3 of a current mirror 23 and a terminal of a capacitor C4 whose other terminal is grounded. The NPN transistors Q102, Q103 have respective emitters connected to an output terminal 23.2 of the current mirror 23. The current mirror 23 has an input terminal 23.1 connected through a resistor R5 to a voltage supply.

Figure 3A:
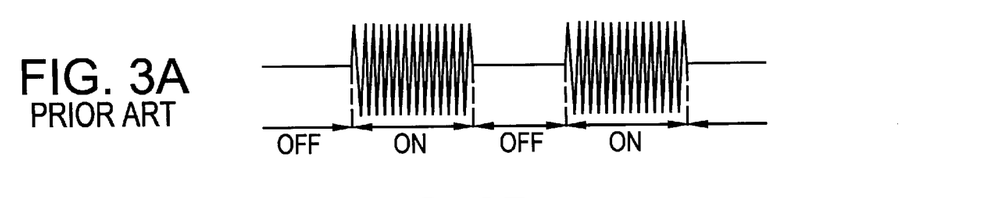
FIGS. 3A through 3D are diagrams showing signal waveforms illustrative of operation of a detector in the conventional infrared signal receiver shown in FIG. 1.

Operation of the detector 4 will be described below with reference to FIGS. 3A though 3D of the accompanying drawings. FIG. 3A shows the waveform of a PPM signal by way of example. As shown in FIG. 3A, the PPM signal comprises on periods where the carrier exists and off periods where only a DC signal exists. The PPM signal is supplied from the output terminal of the BPF 3 to the DC level shifter 15 of the detector 4, and applied to the NPN transistors Q100, Q101. The PPM signal applied to the NPN transistor Q100 is transmitted through the NPN transistor Q100 as an emitter follower to the base of the NPN transistor Q102. The PPM signal applied to the NPN transistor Q101 is transmitted through the NPN transistor Q101 as an emitter follower to the low-pass filter 16 where the carrier of the PPM signal is removed. The PPM signal from the low-pass filter 16 is applied to the base of the NPN transistor Q103. The NPN transistors Q102, Q103 operate as a differential switch. When the base potential of the NPN transistor Q102 is lower than the base potential of the NPN transistor Q103, the NPN transistor Q103 is turned on, allowing a current to flow through the current mirror 17 to the output terminal 17.2 thereof. When the base potential of the NPN transistor Q102 is higher than the base potential of the NPN transistor Q103, the NPN transistor Q103 is turned off, preventing a current from flowing to the output terminal 17.2 of the current mirror 17.

A current $I_4$ which flows from the current mirror 17 when the NPN transistor Q103 is turned on is selected to be larger than a current $I_3$ which flows through the output terminal 23.3 of the current mirror 23. Therefore, when the NPN transistor Q103 is turned on, the capacitor C4 is charged with the difference between the currents $I_4$, $I_3$. When the NPN transistor Q103 is turned off, the capacitor C4 is discharged with the current $I_3$. In each of the on periods of the PPM signal, the capacitor C4 is repeatedly charged with the difference between the currents $I_4$, $I_3$ and discharged with the current $I_3$ according to a sawtooth pattern and becomes high in level. In each of the off periods of the PPM signal, the capacitor C4 becomes low in level as it is only discharged with the current $I_3$. The charging and discharging voltages of the capacitor C4 are expressed as follows:

$$\text{Charging voltage} = \frac{I_4 - I_3}{C4} \times \frac{1}{2f_{IN}} \quad (2)$$

$$\text{Discharging voltage} = \frac{I_3}{C4} \times \frac{1}{2f_{IN}} \quad (3)$$

where $f_{IN}$ represents the carrier frequency of the PPM signal and C4 represents the capacitance of the capacitor C4.

The charging and discharging signal from the capacitor C4 is applied to the waveform shaper 5. The waveform shaper 5 has a hysteresis comparator 18 whose hysteresis width is selected so as not to respond to the peak value of a sawtooth wave generated by extraneous light noise from an inverter-operated fluorescent lamp or the like. The charging and discharging signal from the capacitor C4 is shaped in waveform by the hysteresis comparator 18, which outputs pulses proportional to the on periods of the PPM signal from the output terminal 6.

Figure 3B:
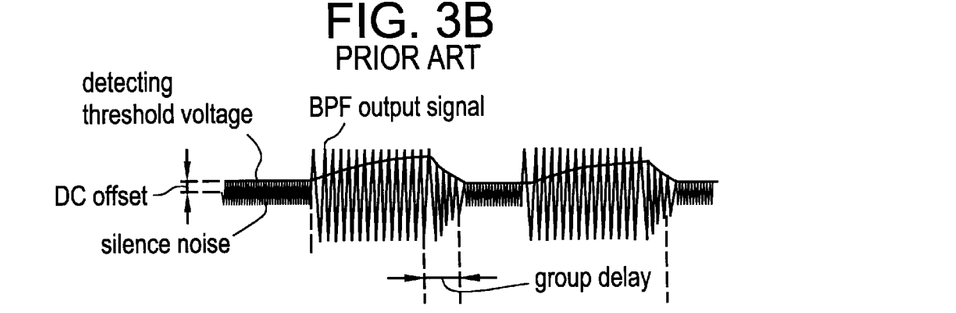
Figure 3C:
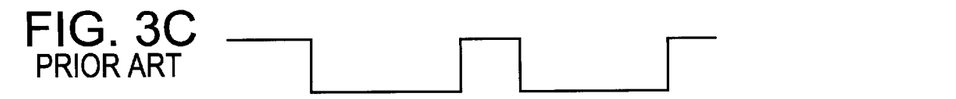
Figure 3D:
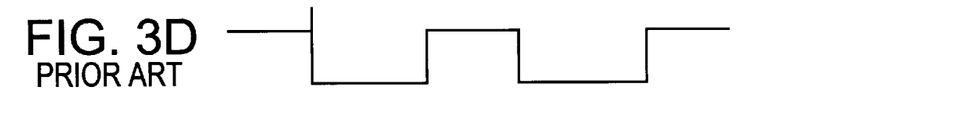

FIG. 3B shows the waveform of the signal at the bases of the NPN transistors Q102, Q103. The base of the NPN transistor Q102 is subject to device noise and extraneous light noise during the off periods of the PPM signal or while there is no signal applied to the base of the NPN transistor Q102. The noise passes through the base of the NPN transistor Q103, making the detector output signal low in level thereby to operate the detector 4 in error. To prevent the detector 4 from operating in error, a potential difference is developed between the base-to-emitter voltages $V_{BE}$ of the NPN transistors Q100, Q101 by the difference between currents $I_1$, $I_2$ flowing through the respective NPN transistors Q100, Q101, for thereby applying a DC offset to the bases of the NPN transistors Q102, Q103. The DC offset thus applied serves as a detecting threshold voltage. The output signal of the BPF 3 which is applied to the base of the NPN transistor Q102 has a group delay interval from the end of each of the on periods of the PPM signal, as shown in FIG. 3B. If the detecting threshold voltage is fixed, then the group delay interval is also detected. As a result, as shown in FIG. 3C, output pulses of the waveform shaper 5, which depend on the on and off periods of the PPM signal, are made longer than the on periods of the PPM signal by the group delay interval, resulting in an erroneous operation. To prevent such an erroneous operation, the ratio of the charging and discharging currents of the low-pass filter 16 is set to about 50:1, increasing the detecting threshold voltage depending on the level of the output signal from the BPF 3. In this manner, a high-level portion of the positive value of the output signal from the BPF 3 is detected, whereas the group delay interval is not detected, so that pulses proportional to the PPM signal as shown in FIG. 3D are outputted from the output terminal 6.

Figures 4A, 4B:
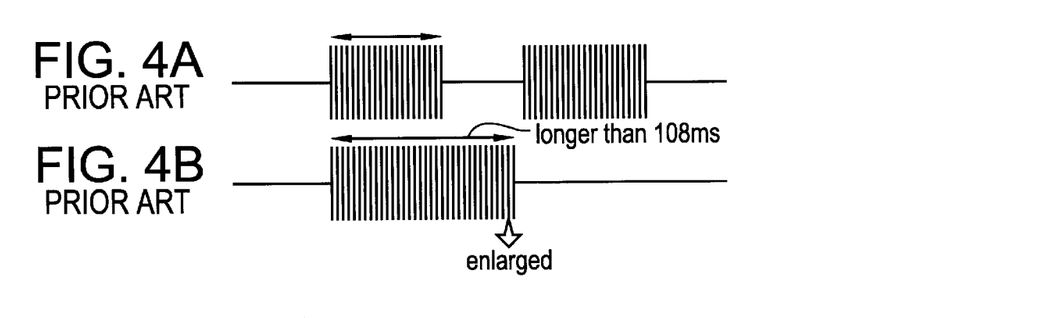
FIGS. 4A through 4D are diagrams showing signal waveforms illustrative of operation of the detector in the conventional infrared signal receiver shown in FIG. 1.

According to a conventional transmission format for infrared signals, as shown in FIG. 4A of the accompanying drawings, a continuous-wave PPM signal for 108 ms is transmitted as a one-command carrier. Recently, as shown in FIG. 4B of the accompanying drawings, there has been proposed a transmission format, such as for use in a VTR search mode, according to which a PPM signal is transmitted as a one-command carrier for a period longer than 108 ms.

The conventional infrared signal receiver is unable to detect such a PPM signal, and makes the output terminal 6 thereof high in level. Since the conventional infrared signal receiver cannot transmit commands accurately, it causes an apparatus which incorporates the conventional infrared signal receiver to operate in error (see FIGS. 4C and 4D of the accompanying drawings).

Figure 4C:
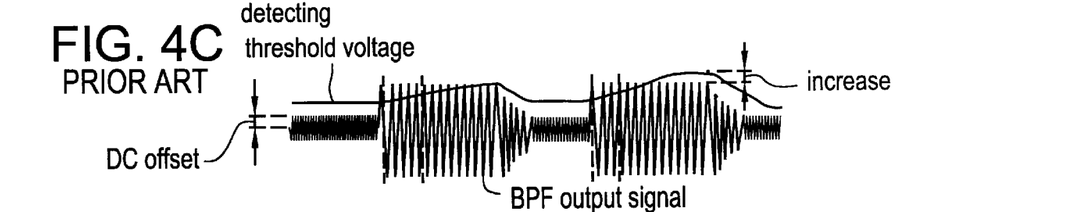
Figure 4D:
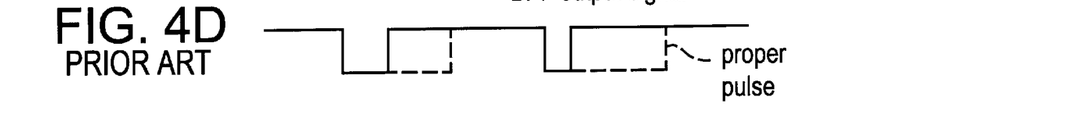

Reasons for such an error will be described below. The carrier of the output signal from the BPF 3 is removed by the low-pass filter 16, and the ratio of the charging and discharging currents of the low-pass filter 16 is varied to increase the detecting threshold voltage, as the offset voltage between the base voltages of the NPN transistors Q102, Q103, depending on the output signal from the BPF 3. When the output signal from the BPF 3 is continuously supplied, the detecting threshold voltage increases in level even during the off periods of the PPM signal, as shown in FIG. 4C, until it reaches a value which is the sum of the peak level of the output signal from the BPF 3 and the DC offset. Therefore, the detecting threshold voltage exceeds the output signal from the BPF 3 applied to the base of the NPN transistor Q102 by the DC offset, failing to detect the on periods of the PPM signal, i.e., failing to turn on the NPN transistor Q103.

SUMMARY OF THE INVENTION

It is an object of the present invention to provide an infrared signal receiver which prevents a detecting threshold voltage from exceeding an output level of a BPF applied to the base of an NPN transistor even when a PPM signal transmitted as a one-command carrier for a period longer than 108 ms is supplied, and is capable of detecting on periods of the PPM signal and outputting pulses proportional to the on periods of the PPM signal from an output terminal for thereby transmitting infrared commands accurately.

An infrared signal receiver according to the present invention employs an attenuated signal from a band-pass filter as a signal for increasing a detecting threshold voltage of a detector. Specifically, the infrared signal receiver includes an attenuator for preventing the detecting threshold voltage from exceeding an output signal from the band-pass filter which is applied to the detector when the detecting threshold voltage increases.

The infrared signal receiver according to the present invention is capable of detecting a continuous-wave PPM signal that is transmitted as a one-command carrier for a period longer than 108 ms. Since the attenuated signal from the band-pass filter is used as a signal for increasing the detecting threshold voltage, the detecting threshold voltage does not exceed the level of the output signal from the band-pass filter which is applied to the base of an NPN transistor of a differential amplifier in the detector.

The infrared signal receiver can output pulses proportional to on periods of the PPM signal from an output terminal thereof for thereby transmitting accurate infrared commands to an apparatus which incorporates the infrared signal receiver.

The above and other objects, features and advantages of the present invention will become apparent from the following description with reference to the accompanying drawings which illustrate an example of the present invention.

DESCRIPTION OF THE PREFERRED EMBODIMENT

Figure 5:
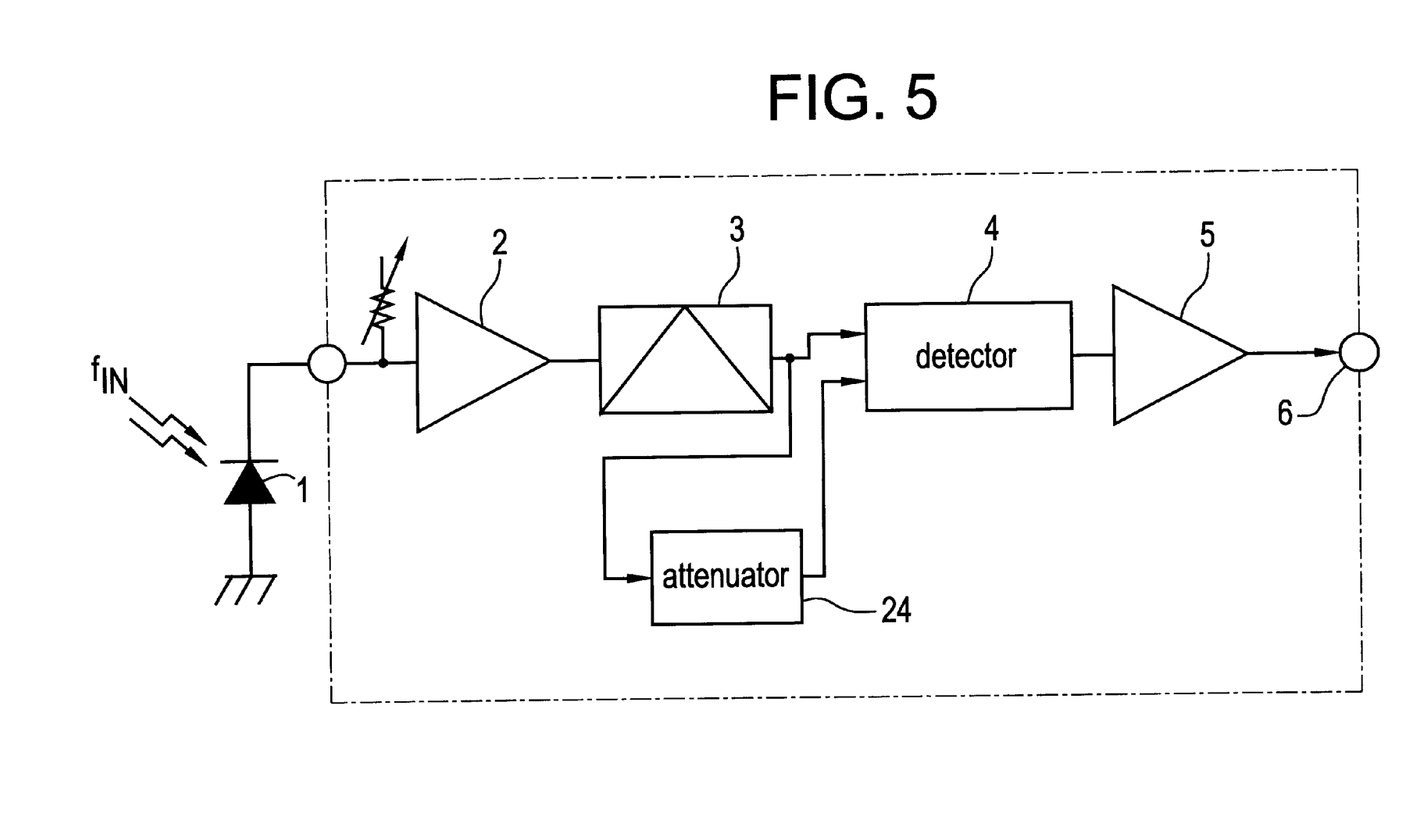
FIG. 5 is a block diagram of an infrared signal receiver according to the present invention.

Referring now to FIG. 5, an infrared signal receiver according to the present invention differs from the conventional infrared signal receiver shown in FIG. 1 in that it additionally has an attenuator 24 for attenuating a BPF output signal, and the BPF output signal and an attenuated signal outputted by the attenuator 24 are supplied to the detector 4. Other details of the infrared signal receiver according to the present invention are identical to those of the conventional infrared signal receiver shown in FIG. 1.

Figure 6:
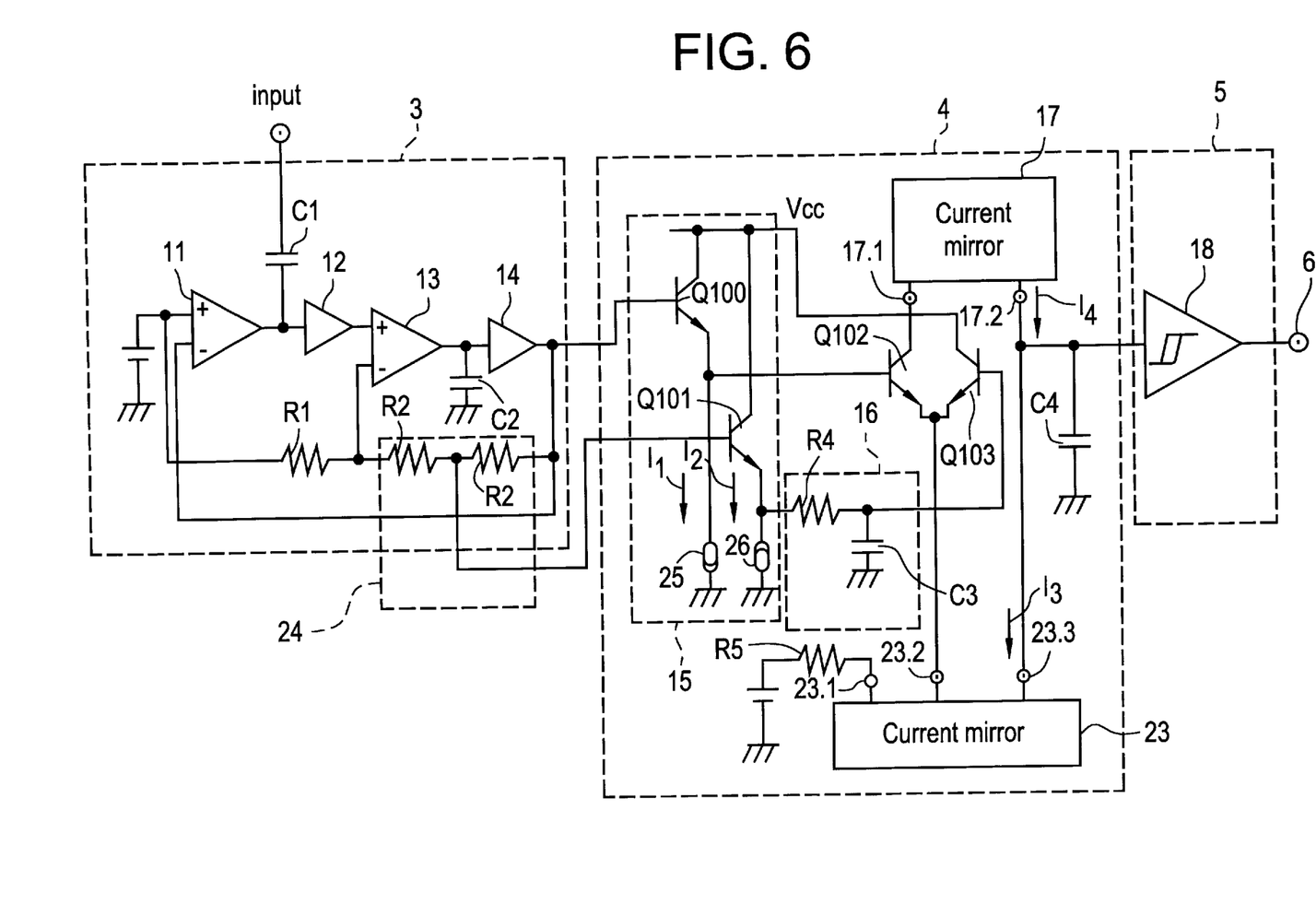
FIG. 6 is a circuit diagram of the infrared signal receiver, except an amplifier, shown in FIG. 5.

FIG. 6 shows the infrared signal receiver according to the present invention, except the amplifier 5, shown in FIG. 5. Details of the infrared signal receiver according to the present invention, other than the attenuator 24 and related details thereof, are identical to those of the conventional infrared signal receiver shown in FIG. 2.

As shown in FIG. 6, the attenuator 24 has an attenuating quantity established in view of a DC offset voltage added by the DC level shifter 15 to the output signal from the BPF 3 to provide against device noise and extraneous light noise caused while there is no signal applied to the base of the NPN transistor Q102, and also in view of the dynamic ranges of the NPN transistors Q102, Q103. The attenuator 24 attenuates only an AC component of the output signal from the BPF 3 with the ratio of the resistances of resistors R2, R3, and outputs the attenuated signal.

Signals in the infrared signal receiver according to the present invention flow essentially in the same manner as with the conventional infrared signal receiver. Specifically, a modulated infrared radiation signal is received by the infrared radiation sensor 1 and amplified by the amplifier 2. The amplified signal is passed through the BPF 3 that is tuned to the carrier of the PPM signal, so that unwanted signal components and noise are removed from the signal from the amplifier 2. The BPF 3 supplies an output signal to the detector 4 which detects low and high levels of the PPM signal. An output signal from the detector 4 is shaped in waveform by the hysteresis comparator 18 of the waveform shaper 5, which outputs pulses depending on the carrier of the PPM signal from the output terminal 6.

The attenuator 24 divides the output signal from the BPF 3 with the resistors R2, R3 which has a resistance ratio of 85:15 depending on the attenuating quantity which has been established in view of the DC offset voltage added by the DC level shifter 15 to the output signal from the BPF 3 to provide against device noise and extraneous light noise caused while there is no signal applied to the base of the NPN transistor Q102, and also in view of the dynamic ranges 50 mV of the NPN transistors Q102, Q103. An attenuated output signal from the attenuator 24 is applied to the DC level shifter 15. The resistors R2, R3 are connected in series between the inverting input terminal of the variable-transconductance amplifier 13 and the output terminal of the buffer 14. The resistors R2, R3 are connected to each other through a junction which serves as the output terminal of the attenuator 24. According to the present embodiment, the DC level shifter 15 has two input terminals provided respectively by the bases of the NPN transistors Q100, Q101. The base of the NPN transistor Q100 is connected to the output terminal of the BPF 3, and the base of the NPN transistor Q101 is connected to the output terminal of the attenuator 24.

Figure 7A:
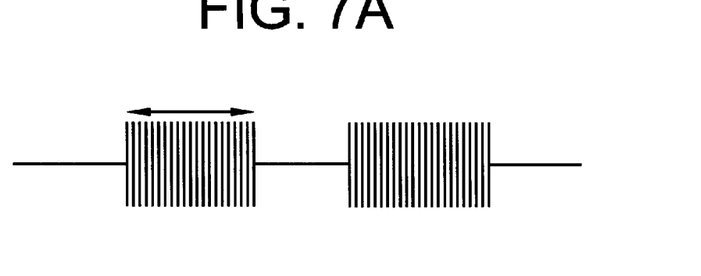
FIGS. 7A through 7D are diagrams showing signal waveforms illustrative of operation of a detector in the infrared signal receiver shown in FIG. 5.
Figure 7B:
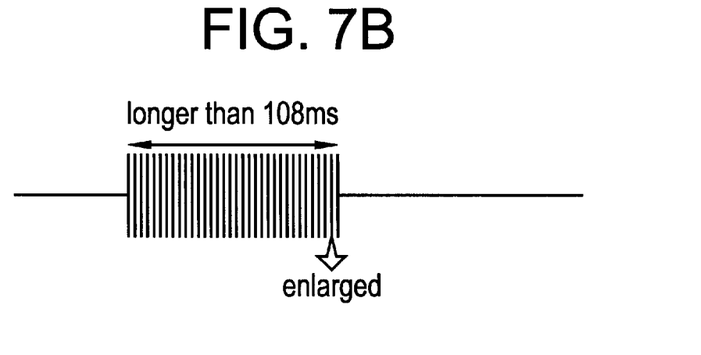
Figures 7C, 7D:
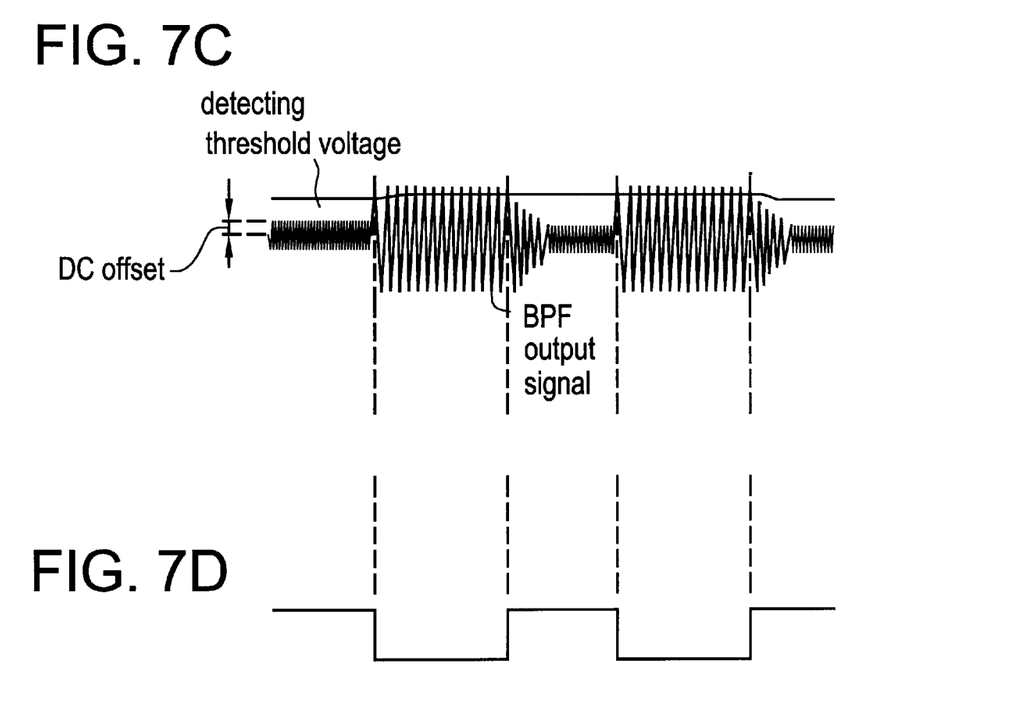

Operation of the detector 4 shown in FIG. 6 will be described below with reference to FIGS. 7A through 7D. The detecting threshold voltage increases depending on the output signal from the BPF 3 by varying the ratio of the charging and discharging currents of the low-pass filter 16. When the output signal from the BPF 3 is continuously supplied, the detecting threshold voltage increases finally to the level of the supplied output signal from the BPF 3. However, according to the present embodiment, the output signal from the BPF 3 has been attenuated by the attenuating quantity which has been established in view of the DC offset voltage added by the DC level shifter 15 to the output signal from the BPF 3 to provide against device noise and extraneous light noise caused while there is no signal applied to the base of the NPN transistor Q102, and also in view of the dynamic ranges 50 mV of the NPN transistors Q102, Q103, and the attenuated signal is supplied to the low-pass filter 16. Therefore, the detecting threshold voltage is prevented from exceeding the output signal from the BPF 3 which is applied to the base of the NPN transistor Q102 (see FIG. 7C). The detector 4 can thus detect a continuous-wave PPM signal for more than 180 ms (see FIG. 7B), longer than a conventional continuous-wave PPM signal (see FIG. 7A), supplied thereto. Consequently, as shown in FIG. 7D, the output terminal 6 of the infrared signal receiver can output accurate pulses proportional to the on periods of the PPM signal, and hence any apparatus which incorporates the infrared signal receiver is prevented from operating in error.

While a preferred embodiment of the present invention has been described using specific terms, such description is for illustrative purposes only, and it is to be understood that changes and variations may be made without departing from the sprit or scope of the following claims.

What is claimed is:

1. An infrared signal receiver comprising:
   an infrared radiation sensor;
   an amplifier for amplifying a signal received by said infrared radiation sensor;
   a band-pass filter for extracting a predetermined frequency component from the signal amplified by said amplifier;
   an attenuator for attenuating an output signal from said band-pass filter;
   a detector including a differential amplifier composed of two transistors and a DC level shifter for being supplied with the output signal from said band-pass filter and an attenuated signal from said attenuator and adding a DC offset to a voltage which turns on said two transistors; and
   a waveform shaper for shaping the waveform of an output signal from said detector.

2. An infrared signal receiver according to claim 1, wherein said attenuator has an attenuating quantity established in view of said DC offset and the dynamic range of said differential amplifier.

3. An infrared signal receiver according to claim 1, wherein said band-pass filter comprises a variable-transconductance amplifier having an inverting input terminal and a buffer having an input terminal connected to an output terminal of said variable-transconductance amplifier, said attenuator comprising two resistors connected in series between said inverting input terminal of the variable-transconductance amplifier and an output terminal of said buffer, said two resistors being connected to each other through a junction which serves as an output terminal of said attenuator.

4. An infrared signal receiver according to claim 1, wherein said DC level shifter comprises a first transistor which can be turned on and off by the output signal from said band-pass filter, a first constant-current supply for supplying a constant current to said first transistor, a second transistor which can be turned on and off by the attenuated signal from said attenuator, and a second constant-current supply for supplying a constant current to said second transistor.

5. An infrared signal receiver according to claim 4, wherein said detector has a low-pass filter for removing a carrier from an output signal from said second transistor of the DC level shifter and outputting the signal to one of the transistors of said differential amplifier.

6. An infrared signal receiver according to claim 1, wherein said detector includes a capacitor and a current mirror for supplying a current to said capacitor to charge and discharge said capacitor when the transistors of said differential amplifier are turned on and off.

* * * * *